(12) United States Patent
Varagnolo et al.

(10) Patent No.: US 10,234,068 B2
(45) Date of Patent: Mar. 19, 2019

(54) FOAMED INSULATION COATING ON PIPES AND METHODS THEREFOR

(71) Applicant: SHAWCOR LTD., Toronto (CA)

(72) Inventors: Roberto Varagnolo, Venice (IT);
Marcos Mockel, Buenos Aires (AR);
Catherine Lam, Richmond Hill (CA);
Dennis Wong, Toronto (CA)

(73) Assignee: Shawcor, Ltd., Toronto, Ontario (CA)

( * ) Notice: Subject to any disclaimer, the term of this patent is extended or adjusted under 35 U.S.C. 154(b) by 361 days.

(21) Appl. No.: 15/132,568

(22) Filed: Apr. 19, 2016

(65) Prior Publication Data

US 2016/0305596 A1    Oct. 20, 2016

Related U.S. Application Data

(60) Provisional application No. 62/149,717, filed on Apr. 20, 2015.

(51) Int. Cl.
*F16L 59/02* (2006.01)
*C08J 9/228* (2006.01)
(Continued)

(52) U.S. Cl.
CPC ........ *F16L 59/028* (2013.01); *B29C 47/0004* (2013.01); *B29C 47/0042* (2013.01); *B29C 47/021* (2013.01); *C08J 9/228* (2013.01); *C08J 9/32* (2013.01); *F16L 59/143* (2013.01); *B29C 47/92* (2013.01); *B29C 2947/92514* (2013.01); *B29C 2947/92704* (2013.01); *B29C 2947/92904* (2013.01); *B29K 2105/04* (2013.01); *B29L 2023/225* (2013.01); *C08J 2201/024* (2013.01); *C08J 2201/03* (2013.01); *C08J 2300/22* (2013.01); *C08J 2323/00* (2013.01); *C08J 2325/06* (2013.01); *C08J 2327/06* (2013.01); *C08J 2355/02* (2013.01);
(Continued)

(58) Field of Classification Search
CPC ........ F16L 59/028; F16L 59/143; C08J 9/228; C08J 9/32; C08J 2201/03; C08J 2300/22; C08J 2201/024; C08J 2323/00; C08J 2325/06; C08J 2327/06; C08J 2355/02; C08J 2369/00; C08J 2371/00; C08J 2375/00; C08J 2377/00; C08J 2379/00; B29C 47/0004; B29C 47/021; B29C 47/0042; B29C 47/92; B29C 2947/92514; B29C 2947/92704; B29C 2947/92904; B29L 2023/225; B29K 2105/04
See application file for complete search history.

(56) References Cited

U.S. PATENT DOCUMENTS 6,225,366 B1    5/2001    Raetzsch et al.

FOREIGN PATENT DOCUMENTS

WO    1993019927 A1    10/1993
WO    2014035501 A2    3/2014

*Primary Examiner* — Michael C Miggins
(74) *Attorney, Agent, or Firm* — Gregory L. Porter; Hunton Andrews Kurth LLP

(57) ABSTRACT

A method of providing a foamed insulation coating on at least a portion of a pipe, including extruding a melt stream over the pipe portion. The melt stream includes a matrix polymer and expandable fillers in an unexpanded state, the melt stream being maintained at a sufficiently high temperature to maintain the matrix polymer in extrudable form and at a sufficiently high pressure to maintain the expandable fillers in the unexpanded state. Once extruded, the expandable fillers are permitted to expand into an expanded state at a lower pressure.

16 Claims, 3 Drawing Sheets

(51) Int. Cl.
  *B29C 47/00* (2006.01)
  *B29C 47/02* (2006.01)
  *F16L 59/14* (2006.01)
  *C08J 9/32* (2006.01)
  B29K 105/04 (2006.01)
  B29L 23/00 (2006.01)
  B29C 47/92 (2006.01)
(52) U.S. Cl.
  CPC ........ *C08J 2369/00* (2013.01); *C08J 2371/00* (2013.01); *C08J 2375/00* (2013.01); *C08J 2377/00* (2013.01); *C08J 2379/08* (2013.01)

FOAMED INSULATION COATING ON PIPES AND METHODS THEREFOR

FIELD

The present disclosure relates to foamed insulation coating for pipes, and methods for providing such coating on pipes. In particular, the present disclosure is suitable for providing insulation on pipes for the onshore and/or offshore oil and gas industry.

BACKGROUND

Oil and gas pipelines typically transport oil or gas at high temperatures, in order to facilitate flow of the oil or gas through the pipeline. These pipelines are typically insulated for efficiency.

Foamed insulation materials, which are material having hollow fillers embedded in a matrix (e.g., a polymer matrix), have been used to insulate pipes. The presence of hollow fillers, which may be glass, ceramic or polymer microspheres, results in hollow cells in the insulation material and improves thermal conductivity (i.e., lowers the k-value) of the insulation material.

There are challenges in the processing of such insulation materials and extrusion of such materials over pipes, including possible breakage of the hollow fillers during processing and extrusion, particularly in the case of glass or ceramic microspheres. Another possible challenge is the need for the matrix material to have relatively high melt strength during the extrusion process, to be able to form stable hollow cells during extrusion and processing. It may also be challenging to control the uniformity and/or density of cells in the insulation material.

SUMMARY

In some examples, the present disclosure provides a method of providing a foamed insulation coating on at least a portion of a pipe, the method comprising: extruding a melt stream over at least the portion of the pipe, the melt stream comprising a matrix polymer and expandable fillers in an unexpanded state, the melt stream being maintained at a sufficiently high temperature to maintain the matrix polymer in extrudable form and at a sufficiently high pressure to maintain the expandable fillers in the unexpanded state; and permitting the expandable fillers in the extruded melt stream to expand into an expanded state at a lower pressure and permitting the matrix polymer to set, to form the foamed insulation coating.

In certain embodiments, the matrix polymer comprises a thermoplastic selected from polyimides, acrylonitrile-butadiene-styrene resins, acetals, chlorinated polyethers, fluorocarbons, polyamides (i.e., nylons), polycarbonates, polyolefins (e.g., polyethylenes, polypropylenes, chlorinated or fluorinated polyolefins, and copolymers thereof), polystyrenes and vinyls (e.g., polyvinyl chloride), thermoplastic polyurethanes and polyureas, and mixtures thereof.

In certain embodiments, the expandable fillers comprise expandable thermoplastic microspheres, having one single or various types of expandable fillers with different expandable dimensions. For example, the expandable thermoplastic microspheres can be comprised of a thermoplastic material selected from the group consisting of: nitrile, acrylic or halogenated resins and their co-polymers (e.g., poly acrylonitrile-co-methacrylonitrile-co-methyl methacrylate or polyacrilonytrile-co-vinylidene chloride-co-methyl methacrylate), acrylic-modified polystyrene or styrene/methyl methacrylate and fluoro-polymers, and combinations thereof.

In certain embodiments, the expandable fillers are metered in the unexpanded state into the melt stream, at a controlled rate, during the extruding.

In certain embodiments, the melt stream is extruded into a mould positioned about at least the portion of the pipe.

In certain embodiments, the melt stream is extruded over an inner anti-corrosion coating covering at least the portion of the pipe.

In certain embodiments, the melt stream is maintained at a temperature in the range of 150° C. to 280° C.

In certain embodiments, the melt stream is maintained at a pressure above 30 bars.

In certain embodiments, the melt stream further comprises at least one additive, for example, an adhesion promoter, an anti-oxidant, a UV stabilizer, a colorant, a curing agent and/or a hardener.

In certain embodiments, the method further comprises preparing the melt stream using at least a first master batch, the first master batch including at least the expandable fillers in an unexpanded state in solid form, wherein preparing the melt stream comprises mixing the first master batch with the matrix polymer in solid form and melting the mixture under controlled temperature and pressure conditions to inhibit expansion of the expandable fillers. For example, the method may further comprise mixing the first master batch and the matrix polymer with a second master batch. The matrix polymer may, in certain embodiments, be provided in solid form as a third master batch.

In certain embodiments, the density of insulation layer results in the range of 200 kg/m³ to 750 kg/m³.

In certain embodiments, the thermal conductivity of the insulation layer results in the range of 0.030 W/mK to 0.160 W/mK.

According to another aspect of the invention is provided an insulated pipe section comprising: a pipe section; a foamed insulation coating at least a portion of the pipe section; and the foamed insulation coating having been formed by extruding a melt stream comprising expandable fillers in an unexpanded state over at least the portion of the pipe section and permitting the expandable fillers in the extruded melt stream to expand into an expanded state after extruding.

In certain embodiments, the melt stream includes a matrix polymer selected from the group consisting of polyimides, acrylonitrile-butadiene-styrene resins, acetals, chlorinated polyethers, fluorocarbons, polyamides (i.e., nylons), polycarbonates, polyolefins (e.g., polyethylenes, polypropylenes, chlorinated or fluorinated polyolefins, and copolymers thereof), polystyrenes and vinyls (e.g., polyvinyl chloride), thermoplastic polyurethanes and polyureas, among others, and mixtures thereof.

In certain embodiments, the expandable fillers comprise expandable thermoplastic microspheres.

In certain embodiments, the expandable thermoplastic microspheres are comprised of a thermoplastic material selected from the group consisting of: nitrile, acrylic or halogenated resins and their co-polymers (e.g., poly acrylonitrile-co-methacrylonitrile-co-methyl methacrylate or polyacrilonytrile-co-vinylidene chloride-co-methyl methacrylate), acrylic-modified polystyrene or styrene/methyl methacrylate and fluoro-polymers, among others, and combinations thereof.

In certain embodiments, the expandable fillers in the unexpanded state are metered into the melt stream, at a controlled rate, during the extruding.

In certain embodiments, the insulated pipe section further comprises an inner anti-corrosion coating covering at least the portion of the pipe.

In certain embodiments, the insulated pipe section further comprises an outer protective coating over the foamed insulation coating.

In certain embodiments, the melt stream is maintained at a temperature in the range of 150° C. to 280° C.

In certain embodiments, the melt stream is maintained at a pressure in the range above 30 bars.

According to a further aspect of the invention is provided a kit comprising: a first master batch including expandable fillers in an unexpanded state, the first master batch being in solid form; and instructions for combining the first master batch with a matrix polymer, and melting the mixture to form a melt stream for extrusion over at least a portion of a pipe to provide at least the portion of the pipe with a foamed insulation coating.

In certain embodiments, the kit further comprises a second master batch including at least one additive, the second master batch being in solid form, wherein the instructions include instructions for combining the first master batch and the second master batch with the matrix polymer.

In certain embodiments, the kit further comprises a third master batch including the matrix polymer in solid form.

In certain embodiments, the instructions include instructions to combine the first master batch with the matrix polymer in a defined proportion.

In certain embodiments, the instructions include instructions to melt the mixture under defined temperature and pressure conditions, to inhibit expansion of the expandable fillers.

According to a further aspect of the present invention is provided an insulated pipe section comprising: a pipe section; a first insulation layer that is closer to an outer surface of the pipe section than a second insulation layer, the first insulation layer comprising a first insulating material having a first melting point that is higher than an expected temperature at the outer surface of the pipe section; and the second insulation layer over an outer surface of the first insulation layer, the second insulation layer comprising a second insulating material having a second melting point that is lower than the expected temperature at the outer surface of the pipe section; the first insulation layer providing sufficient thermal insulation to achieve an expected temperature at the outer surface of the first insulation layer that is lower than the second melting point.

In certain embodiments, the expected temperature at the outer surface of the pipe section is at least 135° C., and the first melting point is at least 10° C. above the temperature at the outer surface of the pipe section.

In certain embodiments, the expected temperature at the outer surface of the first insulation layer is at least 10° C. below the melting point of the second insulation layer.

In certain embodiments, the first insulation layer comprises a polymer resin with improved mechanicals and temperature resistance such as for example, PPSU, PEEK, PEK, PET and PBT, ABS, fluorinated polymers, polyamides and polyimides, POM and Polycarbonates.

In certain embodiments, the first insulation layer has a thickness in the range of 0.5 cm-15 cm.

In certain embodiments, the second insulation layer comprises a polymer selected from the group consisting of: a polyolefin, a styrene resin, a butyl rubber, a nitrile rubber, a thermoplastic polyurethane, a polyurea, and combinations thereof.

In certain embodiments, the second insulation layer has a thickness in the range of 1 cm-20 cm.

In certain embodiments, at least one of the first insulation layer and the second insulation layer is provided using the method of claim 1.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure relates to methods for insulating a pipe using a foamed insulation coating with reduced thermal conductivity (also referred to as reduced k-value). The foamed insulation coating may be used as single-component (e.g., single layer) insulation, or may be used as part of a multi-component (e.g., multi-layered) insulation system for pipes. The present disclosure also relates to pipes provided with such insulation coating. The present disclosure also related to kits for providing such insulation coating. The present disclosure also relates to insulation coating on pipes where the insulation coating includes different insulation layers having different thermal properties. The present disclosure may be useful for providing insulation coating on pipes for the onshore and/or offshore oil and gas industry, and/or other fluid (including liquid and/or gas) transport conduits.

It should be understood that the drawings are not shown to scale, and the dimensions of certain features, such as the hollow fillers and the layers of insulation, may be exaggerated.

Figure 1:
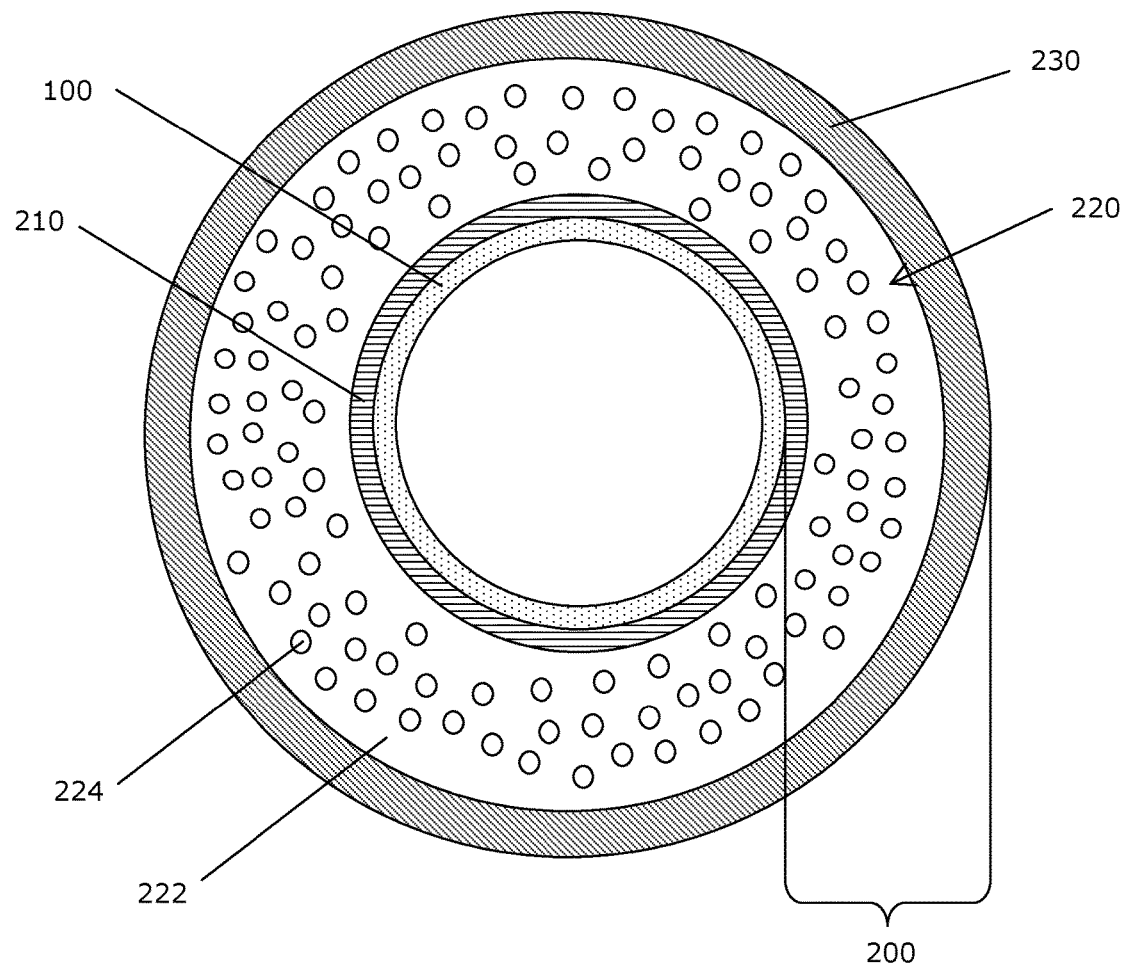
FIG. 1 is a transverse cross-sectional view of an example insulated pipe having a foamed insulation coating, in accordance with an example embodiment of the present disclosure.

FIG. 1 shows a transverse cross-sectional view of a pipe section 100 having an example multi-layered coating 200. The pipe section 100 may be a section for use in an onshore or offshore pipe, for delivery of oil or gas, for example. Although the present disclosure makes reference to the pipe section 100, it should be understood that the present disclosure may be applicable to fluid transport conduits in general.

In oil or gas pipelines, typically, the oil or gas delivered through the pipe section 100 is at a high temperature (e.g., in the range of 100° C. to 140° C. or higher) to help ensure smooth flow of the oil or gas and/or to help avoid unwanted precipitation of hydrates, wax or other chemical components from the oil or gas. The multi-layered coating 200 provides thermal insulation to reduce heat loss from the pipe section 100 and thereby may help to improve efficiency. The multi-layered coating 200 may also provide protection of the pipe section 100, for example corrosion protection and/or abrasion protection.

In the example shown, the multi-layered coating 200 includes an inner anti-corrosion coating 210 that is immediately adjacent to the outer surface of the pipe section 100, a foamed insulation coating 220 and an outer protective coating 230.

The inner anti-corrosion coating 210 may provide corrosion resistance (e.g., protection against corrosion from ingress of moisture, oxygen and other corroding species). For example, the inner anti-corrosion coating 210 may include an epoxy material or a multi-layer polyolefin coating. The inner anti-corrosion coating 210 may be bonded or otherwise coupled to the outer surface of the pipe section 100. For example, the inner anti-corrosion coating 210 may include a fusion bonded epoxy (FBE) layer cured directly to the outer surface of the pipe section 100. Since the inner anti-corrosion coating 210 is immediately adjacent to the outer surface of the pipe section 100, the inner anti-corrosion coating 210 may have thermal properties (e.g., a high melting point) sufficient to withstand expected high temperatures at the outer surface of the pipe section 100 (e.g., at least about 100° C.). The inner anti-corrosion coating 210 may be relatively thin, for example having a thickness of about 40-800 µm, for example. Although not shown, the inner anti-corrosion coating 210 may include additional layers, such as a topcoat layer over the epoxy layer and/or an adhesive layer to help adhere the inner anti-corrosion coating 210 to the insulation coating 220 and act as thermal barrier for coating 220, for example. When inner anti-corrosion coating 210 includes additional layers, thickness of inner layer 210 can be of about 40 µm to 6 mm. For example, where the inner anti-corrosion coating 210 comprises FBE, it may be desirable to provide a coating over the FBE to inhibit absorption of water by the FBE at elevated temperatures (e.g., above 50° C.).

The outer protective coating 230 may provide corrosion resistance as well as abrasion resistance (e.g. protection against dents and scratches). The outer protective coating 230 may be provided at a thickness of about 4 mm to 10 mm, for example. The outer protective coating 230 may include a polymer material such as neoprene, polychloroprene, polyethylene, polypropylene, polyurethane, polyvinyl chloride, nylon, polyurea, and polyester, among others. The outer protective coating 230 may also include other materials, such as a glass or ceramic material, for example. Although not shown, the outer protective coating 230 may include additional layers, such as an adhesive layer to help adhere the outer protective coating 230 to the insulation coating 220. In some examples, the outer protective coating 230 may include a polymer material that is in common with the insulation coating 220, but in an unfoamed state. Using a polymer material that is shared with the insulation coating 220 may help the outer protective coating 230 to adhere better to the insulation coating 220, even without using an adhesive layer.

The foamed insulation coating 220 may include a matrix polymer 222 and expandable fillers 224 embedded therein. The foamed insulation coating 220 may provide low thermal conductivity (e.g., having a k-value of less than 0.200 W/mK, for example less than 0.160 W/mK), and may be able to withstand temperatures of about 80° C. to 125° C. or higher. The foamed insulation coating 220 may be provided at a thickness of about 0.5 cm to 12 cm or more.

The matrix polymer 222 may be a thermoplastic material suitable for use in a melt stream of an extrusion process, as discussed further below. The matrix polymer 222 may have a relatively low melt flow index (e.g., in the range of 0.3 g/10 min to 30 g/10 min, at the expected temperature of the melt stream) so that, in the melt stream, the expandable fillers 224 are able to get easily mixed within polymer 222 and when expanded by preventing damage and inhibited from settling. This may help to ensure that the distribution of the expandable fillers 224 in the melt stream, and in the foamed insulation coating 220 formed therefrom, is relatively uniform and controllable.

Examples of thermoplastic materials that may be suitable for use in the matrix polymer 222 include polyimides, acrylonitrile-butadiene-styrene resins, acetals, chlorinated polyethers, fluorocarbons, polyamides (i.e., nylons), polycarbonates, polyolefins (e.g., polyethylenes, polypropylenes, chlorinated or fluorinated polyolefins, and copolymers thereof), polystyrenes and vinyls (e.g., polyvinyl chloride), thermoplastic polyurethanes and polyureas, among others, and mixtures thereof.

The expandable fillers 224 may be hollow microspheres, for example polymer microspheres. The expandable fillers 224 may contain a medium selected to provide better insulating properties when in its gaseous phase (e.g., a hydrocarbon gas, such as isopentene or isooctane). Such expandable fillers 224 may comprise a thermoplastic polymer shell encapsulating a gas. At high temperatures, the polymer shell softens and the pressure of the encapsulated gas increases, resulting in expansion of the shell. When allowed to cool, the shell stiffens and the expandable filler 224 maintains its expanded state.

The expandable fillers 224 are present in the foamed insulating coating 220 in an expanded state, resulting in the presence of hollow cells within the matrix polymer 222. The presence of such hollow cells serves to decrease the thermal conductivity of the foamed insulation coating 220. In the expanded state, the microspheres may have a diameter in the range of about 10 µm to about 200 µm, for example. The expandable fillers 224 may include any suitable thermoplastic materials such as nitrile, acrylic or halogenated resins and their co-polymers (e.g., poly acrylonitrile-co-methacrylonitrile-co-methyl methacrylate or polyacrilonytrile-co-vinylidene chloride-co-methyl methacrylate), acrylic-modified polystyrene or styrene/methyl methacrylate and fluoropolymers, among others, and combinations thereof. Any suitable commercially-available expandable fillers 224 may be used, for example expandable microspheres available from AKZO Nobel AB under the trade name Expancel®, or from Pierce & Stevens under the trade name Dualite®.

The density and/or distribution of the expandable fillers 224 may be controllable, in order to achieve a desired thermal conductivity profile. For example, during extrusion of the foamed insulation coating 220, described further below, the expandable fillers 224 may be metered out into the melt stream at a controllable rate, which rate may be varied as desired. Alternatively, the expandable fillers 224 may be mixed with the matrix polymer 222 in a desired proportion prior to forming the melt stream. For example, the density of foamed insulation coating 220 may result in the range of 200 kg/m$^3$ to 850 kg/m$^3$ and preferably 200 kg/m$^3$ to 250 kg/m$^3$ for onshore applications and 300 kg/m$^3$ to 750 kg/m$^3$ for offshore shallow water applications. The thermal conductivity of foamed insulation coating 220 may result results in the range of 0.030 W/mK to 0.200 W/mK, preferably 0.030 W/mK to 0.040 w/mk for onshore and 0.070 W/mK to 0.160 W/mK for shallow water applications.

The foamed insulation coating 220 may include components in addition to the matrix polymer 222 and the expandable fillers 224. For example, the foamed insulation coating 220 may include additives to help improve flexibility, elasticity, abrasion resistance, thermal stability, corrosion resistance and/or thermal conductivity properties, among others. Possible additives include adhesion promoters, thermal and/or UV stabilizers, colorants, curing agents and hardeners, among others.

The materials selected for use in the multi-layered coating 200 may be chosen for desired resilience, flexibility, elasticity, abrasion resistance, corrosion resistance and/or thermal conductivity properties, for example. While the multi-layered coating 200 may be designed to provide a desired set of characteristics, it may be that individual layers of the multi-layered coating 200 do not provide all of these characteristics but rather the layers collectively provide these characteristics.

Although FIG. 1 shows the insulation being provided by a multi-layered coating 200, in some examples the inner anti-corrosion coating 210 and/or the outer protective coating 230 may be omitted. In some examples, the foamed insulation coating 220 may be provided as a single-component coating over the pipe section 100 (i.e., as a single-layered coating rather than as part of a multi-layered coating). Where the inner anti-corrosion coating 210 and/or the outer protective coating 230 is omitted, the protection offered by the omitted layer(s) may instead be provided by the foamed insulation coating 220 or other remaining layer(s), for example. For example, where the outer protective coating 230 is omitted, the foamed insulation coating 220 may be free of hollow cells in an outermost region, thus forming an unfoamed "skin" that may provide abrasion protection and resistance to water absorption.

In some examples, the multi-layered coating 200 may include one or more unfoamed insulation coatings in addition to the foamed insulation coating 220. There may be more than one foamed insulation layer making up the foamed insulation coating 220. In some examples, the multi-layered coating 200 may include multiple foamed and/or unfoamed insulation coatings having different thermal properties, as described further below.

Conventional foam insulation, using non-expandable hollow fillers (e.g., glass or ceramic microspheres) or using pre-expanded polymer microspheres in the melt stream, may be challenging to process and extrude onto a pipe section because of the tendency for the hollow microspheres to be crushed during processing and extrusion. When a significant amount (e.g., 5% or more) of the microspheres are crushed, the insulating ability of the insulation may suffer. As well, since this damage to the microspheres is not controlled, the density and distribution of microspheres in the foam insulation may not be at the desired level, resulting in uneven or unsatisfactory thermal insulation. The structural properties of the insulation may also be adversely affected.

In the case of conventional melt streams containing pre-expanded polymer microspheres, it may be necessary for the matrix polymer to have high melt strength, to be able to maintain stable hollow cells during processing and extrusion. This may require additional processing of the matrix polymer and/or use of more costly materials.

In the present disclosure, the foamed insulating coating 220 may be formed by extruding a melt stream, containing the matrix polymer 222 and the expandable fillers 224 in an unexpanded state, directly over the pipe section 100. The expandable fillers 224 may then expand into the expanded state after being extruded directly over the pipe section 100. This method may be carried out prior to pipe-laying or in the field, for example. Pre-coating of the pipe section 100, prior to transport to the field, may be useful to reduce the work required in the field.

Figure 2:
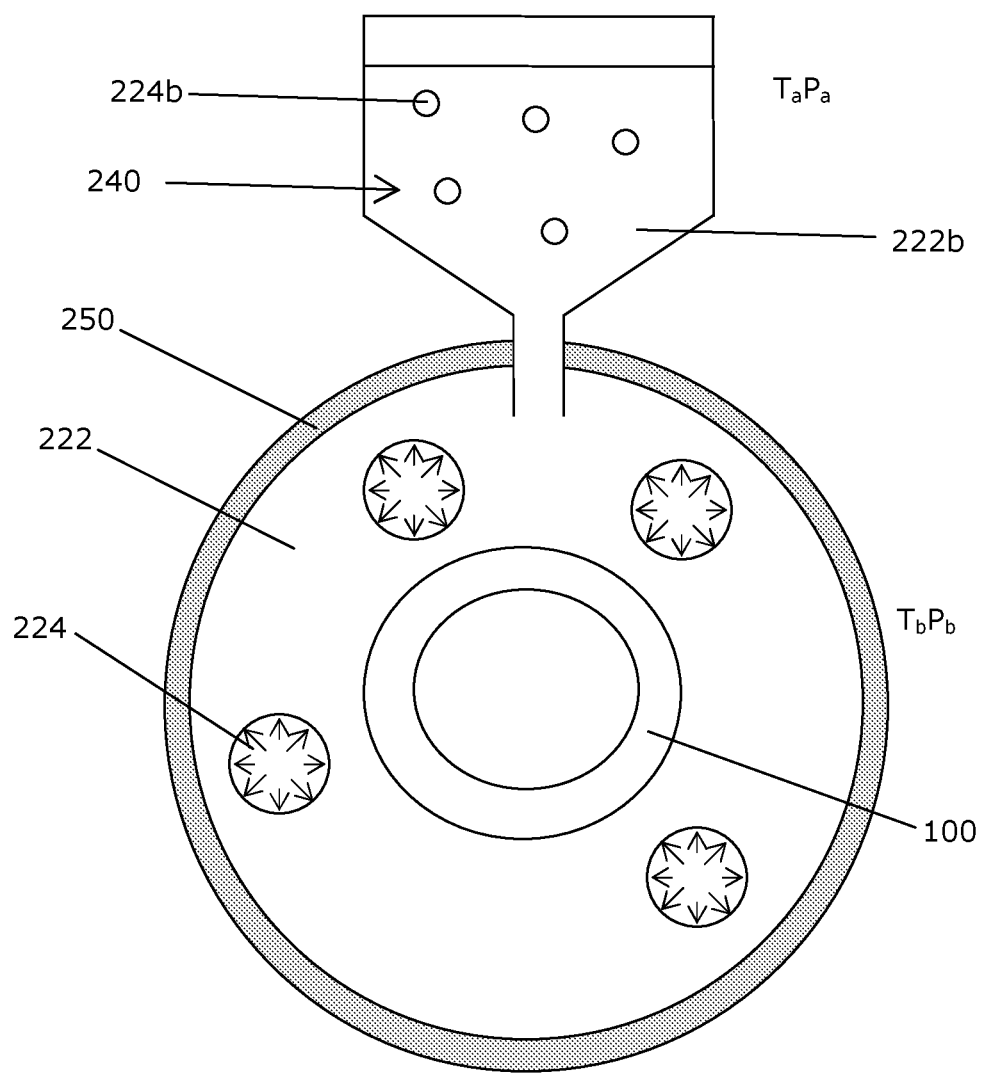
FIG. 2 is a schematic diagram illustrating an example method for providing foamed insulation on a pipe, in accordance with an example embodiment of the present disclosure.

FIG. 2 is a schematic illustration of an example method for providing the foamed insulation coating 220 over the pipe section 100.

In the example shown, a melt stream 240 is maintained at a temperature $T_a$ and a pressure $P_a$. Temperature and pressure sensors may be used to monitor the temperature and pressure of the melt stream 240 and ensure that the temperature and pressure are maintained above a desired threshold or within a desired range. The temperature $T_a$ is sufficiently high to fluidize the matrix polymer 222 into an extrudable state 222b. The temperature $T_a$ would also be sufficient to cause the expandable fillers 224 to expand into the expanded state due to the change of volume of the gas medium within the expandable fillers 224. Pressure $P_a$ is, though, sufficient to maintain the expandable fillers 224 in an unexpanded state 224b. For example, the melt stream 240 may be at a temperature $T_a$ in the range of 150-280° C. and a pressure $P_a$ above 30 bars.

The melt stream 240 may be extruded (e.g., using a suitable hot melt extruder) into a mould 250 (e.g., a cylindrical form) positioned about the pipe section 100. When extruded into the mould 250, the melt stream 240 is exposed to a lower pressure $P_b$ (e.g., standard atmospheric pressure) and possibly a lower temperature $T_b$ (e.g., standard room temperature). Although the temperature $T_b$ may be lower, there may be a period of time before the melt stream 240 cools to the lower temperature $T_b$. The still-hot melt stream 240 and the lower pressure $P_b$ permit expansion (illustrated by arrows in FIG. 2) of the expandable fillers 224 from the unexpanded state 224b into the expanded state 224. The fluidized matrix polymer 222b, as it cools, also sets into a matrix 222, with the expanded fillers 224 embedded therein, thus forming the foamed insulation coating 220. The mould 250 may then be removed.

In some examples, the mould 250 may be cooled (e.g., using a rapid cooling apparatus) to speed up curing of the foamed insulation coating 220.

In some examples, the melt stream 240 may be extruded directly onto the outer surface of an uncoated pipe section 100. In other examples, the melt stream 240 may be extruded directly onto a pipe section 100 that is already coated with an inner anti-corrosion coating 210 (see FIG. 1). In some examples, after the foamed insulation coating 220 has been set and the mould 250 removed, an outer protective coating 230 (see FIG. 1) may be applied.

Although FIG. 2 shows the melt stream 240 already containing both the fluidized matrix polymer 222b and the unexpanded fillers 224b, in some examples there may be a metering stage (not shown) where the unexpanded fillers 224b are metered into the fluidized matrix polymer 222b and mixed into the melt stream 240. The unexpanded fillers 224b may be introduced into the fluidized matrix polymer 222b in the melt stream 240 under controlled temperature and pressure conditions, to avoid premature expansion into the expanded state. The unexpanded fillers 224b may be metered into the melt stream 240 in situ, at the site of extrusion and optionally during extrusion of the melt stream 240 over the pipe section 100. In some examples, the rate at which the unexpanded fillers 224b are introduced into the melt stream 240 may be controlled and optionally variable, while the melt stream 240 is being extruded over the pipe section 100, such that a desired density and/or distribution of expandable fillers 224 in the resulting foamed insulating coating 220 may be achieved.

In some examples, the melt stream 240 may be prepared by melting a pre-mixed "master batch" comprising the matrix polymer 222 and unexpanded fillers 224b in solid form. The pre-mixed batch may be in the form of solid pellets or powder, including a desired percentage of unexpanded fillers 224b mixed into the matrix polymer 222, together with any additives. The forming of the pre-mixed batch pellets and the melting of the pre-mixed batch into the melt stream 240 may be carried out under controlled temperature and pressure conditions, to avoid premature expansion of the unexpanded fillers 224b.

In some examples, the melt stream 240 may be prepared by mixing together and melting two or more master batches. Each master batch may provide one or more components of the melt stream 240 in solid form, and may be mixed in a desired proportion in order to achieve a melt stream 240 having a desired proportion of the components. For example, the matrix polymer 222 and the unexpanded fillers 224b may be provided in solid form (e.g., as solid pellets or powder) in two separate master batches. The two batches may then be mixed in a desired proportion (e.g., a 100:5 weight ratio of matrix polymer pellets to unexpanded filler powder) and melted to form the melt stream 240. Any additives may be provided in solid form as another separate batch and mixed in, at a desired proportion. Melting of the mixed batches may be carried out under controlled temperature and pressure conditions, to avoid premature expansion of the unexpanded fillers 224b. It may be desirable for the melting point of each master batch to be substantially equal or within a relatively small range (e.g., within about 20° C. of each other) to simplify preparation of the melt stream 240. In some examples, the master batch providing the unexpanded fillers 224b or any additives may also include the matrix polymer 222. For example, the master batch providing additives may be in the form of solid pellets, each pellet containing a mixture of the matrix polymer 222 and the additives in a known proportion.

Where the melt stream 240 is prepared using one or more master batches, the master batch(es) may be prepared off-site and transported to the site of extrusion. The master batch(es) may be relatively inert and stable at standard conditions (e.g., at room temperature and within a fairly large temperature range) for extended periods of time (e.g., for months or longer), which may enable the master batch(es) to be formed in large quantities rapidly and inexpensively at a centralized factory, then stored and transported to the extrusion site. The master batch(es) may then be mixed (where two or more master batches are used) and melted into the melt stream 240 at the site of extrusion and optionally during extrusion over the pipe section 100. In some examples, the master batches may be sourced from different locations. For example, the master batch providing unexpanded fillers 224b may be sourced from a centralized factory, while the master batch providing the matrix polymer 222 may be sourced locally at the extrusion site.

The use of master batches may enable convenient and easy transport of coating components to the extrusion site, flexibility in adjusting and controlling component proportions, and easy and convenient measurement and mixing of coating components to form the melt stream 240. Using master batch(es), the melt stream 240 may be prepared at the extrusion site using relatively inexpensive and available equipment (e.g., using a cement mixer or tumble blender), without requiring a high level of worker skill or discretion.

In some examples, master batches of the insulation coating components may be provided in the form of a kit, where the kit includes a first master batch comprising the unexpanded fillers 224b, and optionally a second master batch comprising any additives. The kit may further include instructions for combining the master batches with matrix polymer pellets from another source then melting the mixture to form the melt stream 240. The instructions may include instructions to control the temperature and pressure during melting, to avoid premature expansion of the unexpanded fillers 224b. The instructions may also include instructions to mix the master batches in a desired proportion. In some examples, the kit may include a third master batch comprising the matrix polymer 222, in which case the master batches may not need to be mixed with matrix polymer pellets from another source. The kit may contain the batches already in the desired proportion, thus avoiding the need to measure the batches.

The method for providing the foamed insulation coating 220 on the pipe section 100 may be carried out as part of a multi-step process for providing the multi-layered coating 200 on the pipe section 100. For example, extrusion of the foamed insulation coating 220 may be carried out in-line with extrusion of the inner anti-corrosion coating 210 and/or the outer protective coating 230, and these steps may all take place in the same manufacturing facility (e.g., on the same pipe conveying apparatus).

Figure 3:
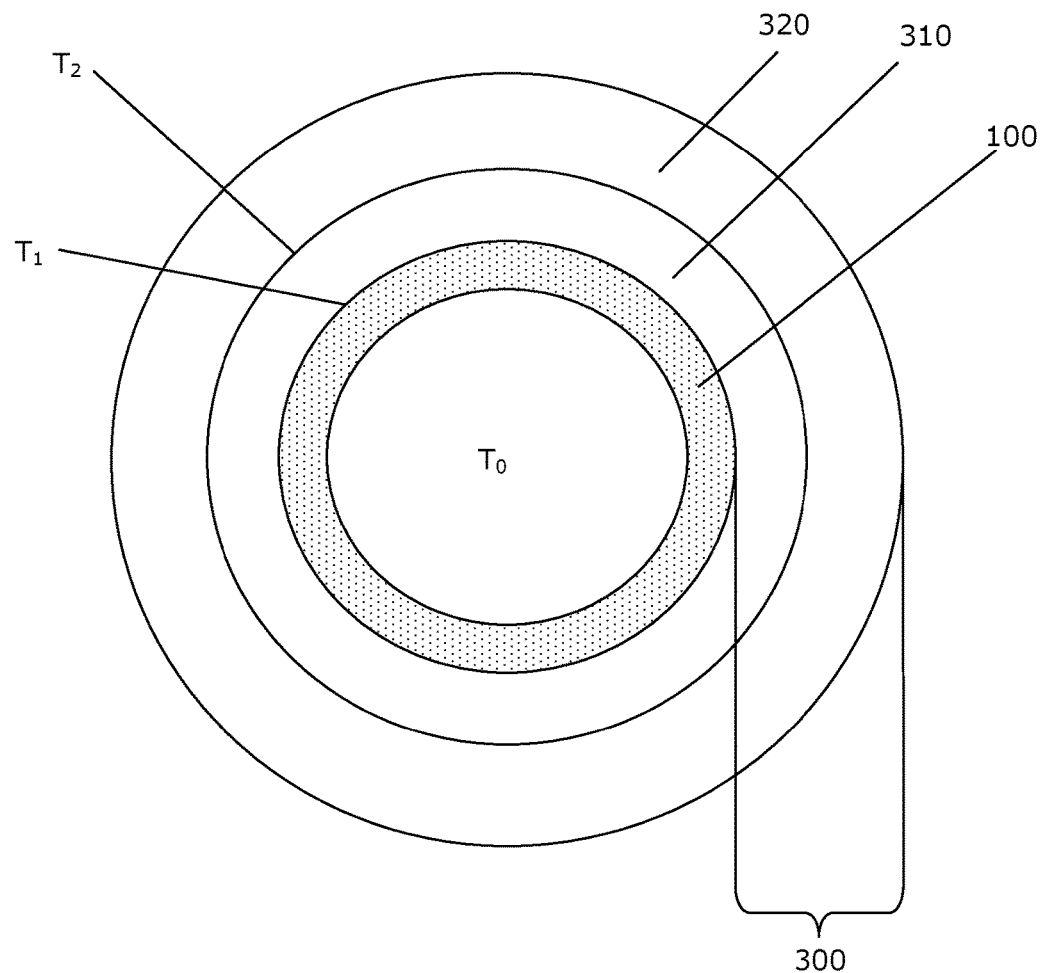
FIG. 3 is a transverse cross-sectional view of an example insulated pipe having multiple insulation layers, in accordance with an example embodiment of the present disclosure.

FIG. 3 shows a transverse cross-sectional view of the pipe section 100 having another example multi-layered coating 300. For simplicity, the inner anti-corrosion coating 210 and the outer protective coating 230 are not shown, however the inner anti-corrosion coating 210 and/or the outer protective coating 230 may be present. In this example, the multi-layered coating 300 may include two or more insulation layers 310, 320 having different thermal properties. For simplicity, only two insulation layers 310, 320 are shown, however it should be understood that there may be more than two insulation layers 310, 320.

The two or more insulation layers 310, 320 may be arranged concentrically about the pipe section 100. In this example, the insulation layer 310 that is positioned closer to the pipe section 100 is referred to as the first insulation layer 310, and the insulation layer 320 positioned further from the pipe section 100 is referred to as the second insulation layer 320. Another insulation layer (not shown) positioned further from the pipe section 100 than the second insulation layer 320 would be referred to as a third insulation layer, and so forth.

In some examples, the first insulation layer 310 may be provided directly adjacent to the outer surface of the pipe section 100. In other examples, there may be an inner anti-corrosion coating 210 (see FIG. 1) between the pipe section 100 and the first insulation layer 310. The second insulation layer 320 may be directly adjacent to the first insulation layer 310. In some examples, the second insulation layer 320 may be bonded directly to the first insulation layer 310. In other examples, there may be an adhesive layer (not shown) between the first and second insulation layers 310, 320 to help the first and second insulation layers 310, 320 adhere to each other.

The fluid (e.g., oil or gas) delivered through the pipe section 100 is expected to be at an elevated temperature $T_0$ (e.g., in the range of 100° C. to 160° C. or higher). The first insulation layer 310, being positioned close to the outer surface of the pipe section 100, would be expected to be exposed to a high temperature $T_1$, which may be as high as or only slightly cooler than the temperature $T_0$ within the pipe section 100. For example, $T_1$ may be about 135° C. The thermal conductivity of the first insulation layer 310 may be sufficiently low such that, combined with the thickness of the first insulation layer 310, the temperature $T_2$ at the outer surface of the first insulation layer 310 is lower than $T_1$. The second insulation layer 320, being positioned adjacent to the outer surface of the first insulation layer 310, would be expected to be exposed to the lower temperature $T_2$, rather than $T_1$.

While the first insulation layer 310 may be required to have characteristics sufficient to withstand the higher temperature $T_1$ (e.g., having a melting point higher than $T_1$), the second insulation layer 320 may not need to have such characteristics. For example, the second insulation layer 320 may only need to withstand the lower temperature $T_2$, and may thus have a melting point that is higher than $T_2$, but lower than $T_1$. As well, the first insulation layer 310 may be required to have low thermal conductivity to insulate against the higher temperature $T_1$, while the second insulation layer 320 may be permitted to have higher thermal conductivity.

The expected values of $T_0$, $T_1$ and $T_2$ may be determined by calculating the thermal profile across the multi-layered coating 300, using suitable finite element analysis modeling and/or simulation methods. Typically, the value of $T_0$, which is the temperature of fluid within the pipe section 100 would be known as well as the boundary conditions of the environment to which the coated pipe will be exposed to. For example, temperature of environment, convections coefficient, among others are some of the variables used as input for finite element analysis model and therefore calculations of expected $T_1$ and $T_2$.

The first insulation layer 310 may include any polymer resin with improved mechanicals and temperature resistance such as for example, PPSU, PEEK, PEK, PET and PBT, ABS, fluorinated polymers, polyamides and polyimides, POM and polycarbonates. The second insulation layer 320 may include a different polymer material, such as polyolefins, styrene resins, butyl and/or nitrile rubber, thermoplastic polyurethanes and polyureas.

The first insulation layer 310 may have a thickness in the range of about 0.5 cm to about 15 cm, for example, while the second insulation layer 320 may have the same or different thickness in the range of about 1 cm to about 20 cm, for example. The thermal conductivity for the first insulation layer 310 may be less than 1 W/mK, for example less than 0.5 W/mK. The thermal conductivity for the second insulation layer 320 may be similar to, and in many instances lower than that of the first insulation layer 310, for example. The melting point of the first insulation layer 310 may be at least 10° C. higher than exposure temperature $T_1$ of layer 310 (in this example case: 145° C.), while the melting point of the second insulation layer 320 could be lower, since exposure $T_2$ of layer 320 will be lower.

The insulation layers 310, 320 may include a foamed insulation coating, as described above, and/or may include an unfoamed insulation coating. In some examples, the insulation layers 310, 320 may include only unfoamed insulation coating.

By enabling the second insulation layer 320 to have less stringent characteristics (e.g., having a lower melting point and/or higher thermal conductivity), the present disclosure may enable the second insulation layer 320 to include a material that is less costly than the material used in the first insulation layer 310. The second insulation layer 320 may also use materials having desired characteristics (e.g., abrasion-resistance, flexibility or density) that would be difficult, impossible and/or costly to achieve using high melting point materials.

The embodiments of the present disclosure described above are intended to be examples only. The present disclosure may be embodied in other specific forms. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

The invention claimed is:

1. A method of providing a foamed insulation coating on at least a portion of a pipe, the method comprising:
   extruding a melt stream over at least the portion of the pipe, the melt stream comprising a matrix polymer and expandable fillers in an unexpanded state, the melt stream being maintained at a sufficiently high temperature to maintain the matrix polymer in extrudable form and at a sufficiently high pressure to maintain the expandable fillers in the unexpanded state; and
   permitting the expandable fillers in the extruded melt stream to expand into an expanded state at a lower pressure and permitting the matrix polymer to set, to form the foamed insulation coating.

2. The method of claim 1 wherein the matrix polymer comprises a thermoplastic selected from the group consisting of: polyimides, acrylonitrile-butadiene-styrene resins, acetals, chlorinated polyethers, fluorocarbons, polyamides (i.e., nylons), polycarbonates, polyolefins (e.g., polyethylenes, polypropylenes, chlorinated or fluorinated polyolefins, and copolymers thereof), polystyrenes and vinyls (e.g., polyvinyl chloride), thermoplastic polyurethanes and polyureas, and mixtures thereof.

3. The method of claim 1 further comprising metering the expandable fillers in the unexpanded state into the melt stream, at a controlled rate, during the extruding.

4. The method of claim 1 wherein the melt stream is extruded into a mould positioned about at least the portion of the pipe.

5. The method of claim 1 wherein the melt stream is extruded over an inner anti corrosion coating covering at least the portion of the pipe.

6. The method of claim 1 wherein the melt stream is maintained at a temperature in the range of 150° C. to 280° C.

7. The method of claim 1 wherein the melt stream is maintained at a pressure above 30 bars.

8. The method of claim 1 where the density of insulation layer results in the range of 200 kg/m3 to 750 kg/m3.

9. The method of claim 1 where the thermal conductivity of insulation layer results in the range of 0.030 W/mK to 0.160 W/mK.

10. The method of claim 1 wherein the expandable fillers comprise expandable thermoplastic microspheres, having one single or various types of expandable fillers with different expandable dimensions.

11. The method of claim 10 wherein the expandable thermoplastic microspheres are comprised of a thermoplastic material selected from the group consisting of nitrile, acrylic or halogenated resins and their co-polymers (e.g., poly acrylonitrile-co-methacrylonitrile-co-methyl methacrylate or polyacrilonytrile-co-vinylidene chloride-co-methyl methacrylate), acrylic-modified polystyrene or styrene/methyl methacrylate and fluoro-polymers, and combinations thereof.

12. The method of claim 1 wherein the melt stream further comprises at least one additive.

13. The method of claim 12 wherein the at least one additive is an adhesion promoter, an anti-oxidant, a UV stabilizer, a colorant, a curing agent or a hardener.

14. The method of claim 1 further comprising preparing the melt stream using at least a first master batch, the first master batch including at least the expandable fillers in an unexpanded state in solid form, wherein preparing the melt stream comprises mixing the first master batch with the matrix polymer in solid form and melting the mixture under controlled temperature and pressure conditions to inhibit expansion of the expandable fillers.

15. The method of claim 14 wherein preparing the melt stream further comprises mixing the first master batch and the matrix polymer with a second master batch.

16. The method of claim 14 wherein the matrix polymer is provided in solid form as a third master batch.

* * * * *